(12) United States Patent
Jurik

(10) Patent No.: US 10,359,636 B2
(45) Date of Patent: Jul. 23, 2019

(54) BEAM SHAPER

(71) Applicant: Robe Lighting s.r.o., Roznov pod Radhostem (CZ)

(72) Inventor: Pavel Jurik, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 357 days.

(21) Appl. No.: 14/060,458

(22) Filed: Oct. 22, 2013

(65) Prior Publication Data

US 2015/0109677 A1 Apr. 23, 2015
US 2019/0064533 A9 Feb. 28, 2019

Related U.S. Application Data

(63) Continuation of application No. 12/880,075, filed on Sep. 11, 2010, now abandoned.

(60) Provisional application No. 61/241,645, filed on Sep. 11, 2009.

(51) Int. Cl.
*G02B 27/10* (2006.01)
*G02B 27/09* (2006.01)
*G02B 19/00* (2006.01)

(52) U.S. Cl.
CPC ..... *G02B 27/0955* (2013.01); *G02B 19/0014* (2013.01); *G02B 19/0047* (2013.01)

(58) Field of Classification Search
CPC ............................ G02B 27/09; G02B 27/0955
USPC ........................................ 359/622, 619, 621
See application file for complete search history.

(56) References Cited

U.S. PATENT DOCUMENTS

| | | |
|---|---|---|
| 3,484,599 A | 12/1969 | Little |
| 5,665,305 A | 9/1997 | Belliveau et al. |
| 5,758,995 A | 6/1998 | Belliveau |
| 5,775,799 A | 7/1998 | Forkner |
| 5,980,066 A | 11/1999 | Belliveau et al. |
| 6,048,080 A | 4/2000 | Belliveau |
| 6,809,869 B2 | 10/2004 | Hough |
| 2004/0042085 A1 | 3/2004 | Hough |
| 2008/0278925 A1 | 11/2008 | Wernersson |
| 2009/0109681 A1 | 4/2009 | Jurik |
| 2011/0103073 A1 | 5/2011 | Juik |

FOREIGN PATENT DOCUMENTS

| | | |
|---|---|---|
| CN | 2212701 Y | 11/1995 |
| CN | 1916485 A | 2/2007 |
| CN | 101194206 A | 6/2008 |
| CN | 201083368 Y | 7/2008 |
| CN | 201203052 Y | 3/2009 |
| DE | 3926618 A1 | 2/1991 |

OTHER PUBLICATIONS

Office Action dated Apr. 3, 2012; U.S. Appl. No. 12/880,075, filed Sep. 11, 2010; 5 pages.

(Continued)

*Primary Examiner* — Jack Dinh
(74) *Attorney, Agent, or Firm* — Conley Rose, P.C.; Grant Rodolph; Brooks W Taylor

(57) ABSTRACT

Described are an improved automated luminaire and luminaire systems employing a matching lenslet pair beam shaper. The beam shaper employs nesting lenslets that are articulated so that the degree of beam shaping modulation is continuously adjustable across a range of modulation.

16 Claims, 12 Drawing Sheets

(56) References Cited

OTHER PUBLICATIONS

Final Office Action dated Apr. 22, 2013; U.S. Appl. No. 12/880,075, filed Sep. 11, 2010; 11 pages.
Notice of Allowance dated Nov. 1, 2013; U.S. Appl. No. 12/880,075, filed Sep. 11, 2010; 8 pages.
PCT International Search Report; Application No. PCT/US2010/048547; dated Dec. 15, 2010; 3 pages.
PCT Written Opinion of the International Searching Authority; Application No. PCT/US2010/048547; dated Dec. 15, 2010; 4 pages.
Chinese Office Action; Application No. 201080050445.0; dated Feb. 8, 2014; 9 pages.
Chinese Office Action; Application No. 201080050445.0; dated Nov. 15, 2014; 8 pages.
Chinese Office Action; Application No. 201080050445.0; dated Nov. 16, 2015; 10 pages.
Chinese Office Action; Application No. 201080050445.0; dated Aug. 3, 2016; 11 pages.
Chinese Office Action; Application No. 201080050445.0; dated Apr. 1, 2017; 9 pages.
European Examination Report; Application No. 10768830.1; dated Oct. 21, 2016; 6 pages.

BEAM SHAPER

CROSS-REFERENCE TO RELATED APPLICATIONS

This application is a continuation of U.S. patent application Ser. No. 12/880,075 filed Sep. 11, 2010 by Pavel Jurik entitled, "Beam Shaper", which claims priority to U.S. Provisional Application No. 61/241,645 filed Sep. 11, 2009 by Pavel Jurik entitled, "Beam Shaper".

TECHNICAL FIELD OF THE DISCLOSURE

The present disclosure generally relates to automated luminaire(s), specifically to a beam shaper for use within automated luminaire(s).

BACKGROUND OF THE DISCLOSURE

Luminaires with automated and remotely controllable functionality are well known in the entertainment and architectural lighting markets. Such products are commonly used in theatres, television studios, concerts, theme parks, night clubs, and other venues. A typical product will commonly provide control over the pan and tilt functions of the luminaire allowing the operator to control the direction the luminaire is pointing and thus the position of the light beam on the stage or in the studio. Typically this position control is done via control of the luminaire's position in two orthogonal rotational axes usually referred to as pan and tilt. Many products provide control over other parameters such as the intensity, color, focus, beam size, beam shape, and beam pattern. The beam pattern is often provided by a stencil or slide called a gobo which may be a steel, aluminum, or etched glass pattern. The products manufactured by Robe Show Lighting such as the ColorSpot 700E are typical of the art.

The optical systems of such luminaires may include a beam shaping optical element through which the light is constrained to pass. A beam shaping element may comprise an asymmetric or lenticular lens or collection of lenses that constrain a light beam that is symmetrical and circular in cross section to one that is asymmetrical and predominantly elliptical or rectangular in cross section. A prior art automated luminaire may contain a plurality of such beam shapers each of which may have a greater or lesser effect on the light beam and that may be overlapped to produce a composite effect. For example, a weak beam shaper may constrain a circular beam that has a symmetrical beam angle of 20° in all directions into a primarily elliptical beam that has a major axis of 30° and a minor axis of 15°. A more powerful beam shaper may constrain a circular beam that has a symmetrical beam angle of 20° in all directions into a primarily elliptical beam that has a major axis of 40° and a minor axis of 10°. It is also common in prior art luminaires to provide the ability to rotate the beam shaper along the optical axis such that the resultant symmetrical elliptical beam may also be rotated. U.S. Pat. No. 5,665,305; U.S. Pat. No. 5,758,955; U.S. Pat. No. 5,980,066; and U.S. Pat. No. 6,048,080 disclose such a system where a plurality of discrete lens elements are used to control the shape of a light beam.

FIG. 1 illustrates a typical multiparameter automated luminaire system 10. These systems commonly include a plurality of multiparameter automated luminaires 12 which typically each contain on-board a light source (not shown), light modulation devices, electric motors coupled to mechanical drive systems, and control electronics (not shown). In addition to being connected to mains power either directly or through a power distribution system (not shown), each automated luminaire 12 is connected in series or in parallel to data link 14 to one or more control desks 15. The automated luminaire system 10 is typically controlled by an operator through the control desk 15.

FIG. 2 illustrates a typical automated luminaire 12. A lamp 21 contains a light source 22 which emits light. The light is reflected and controlled by reflector 20 through an aperture or imaging gate 24 and then through a variable aperture (not shown). The resultant light beam may be further constrained, shaped, colored, and filtered by optical devices 26 which may include dichroic color filters, beam shapers, gobos, rotating gobos, framing shutters, effects glass, and other optical devices well known in the art. The final output beam may be transmitted through output lenses 28 and 31 which may form a zoom lens system.

FIG. 3 and FIG. 4 illustrate the construction and operation of a prior art example of a beam shaper 30. FIG. 3 illustrates a beam shaper 30 that comprises a disc of optically transparent material such as glass or polycarbonate that is embossed or molded with a pattern or array of raised or lowered linear areas 32 to form an array of ribbed or lenticular lenses. When the substantially circular light beam passes through this ribbed or lenticular lens the cross section 34 of that beam will be constrained to a cross section that is asymmetrical and predominantly elliptical or rectangular in shape as shown in FIG. 4. Such a system may be rotated around an axis parallel with the optical axis of the luminaire to rotate the elliptical beam shown in FIG. 4, however, neither the size of the ellipse nor its eccentricity can be altered by this beam shaper 30. Prior arts systems may contain multiple such devices with different patterns such that the size and eccentricity of the effect can be selected by using the appropriate beam shaper 30. However, this selection is discrete and provides the user no opportunity to continuously, over a range, adjust the magnitude of the effect. For example, if a different degree of eccentricity is desired a different beam shaper 30 needs to be inserted into the light beam path. Assuming a luminaire had two beam shapers 30 that could be substituted for each other, three discrete degrees of eccentricity effect could be achieved: no beam shaper, beam shaper 1, and beam shaper 2. However, the user could not vary the degrees of eccentricity between these two effects. If two beam shapers 30 could simultaneously be placed in the beam then four (4) effects may be achieved: no beam shaper, both beam shapers simultaneously and, assuming the beam shapers were not the same, each would individually have a different degree of effect.

There is a need for an improved beam shaper mechanism for an automated luminaire which provides the ability to smoothly and continuously adjust the size and/or eccentricity of the constrained light beam over a range of sizes and/or degrees of eccentricity.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to an automated luminaire, specifically to the configuration of a beam shaper lens within such a luminaire such that it provides the ability to adjust the size or eccentricity of the constrained light beam.

Figure 1:
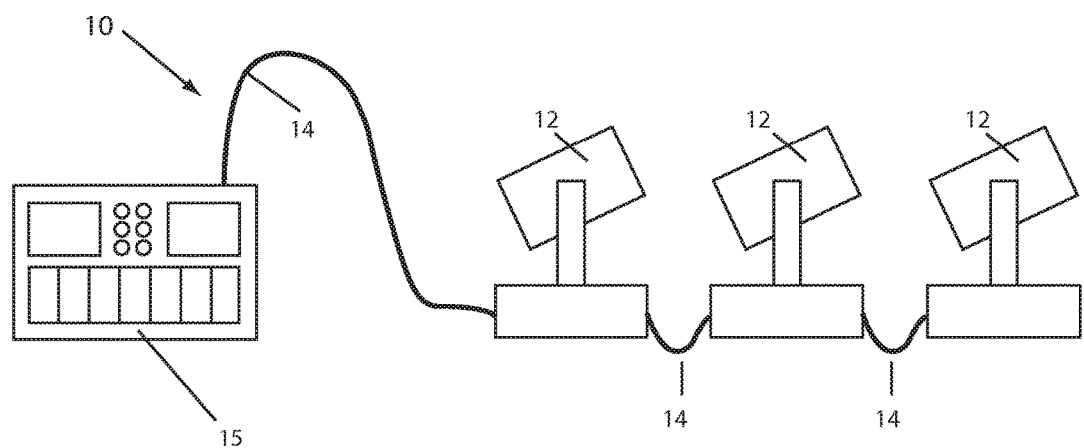
FIG. 1 illustrates a typical multiparameter automated lighting system.
Figure 2:
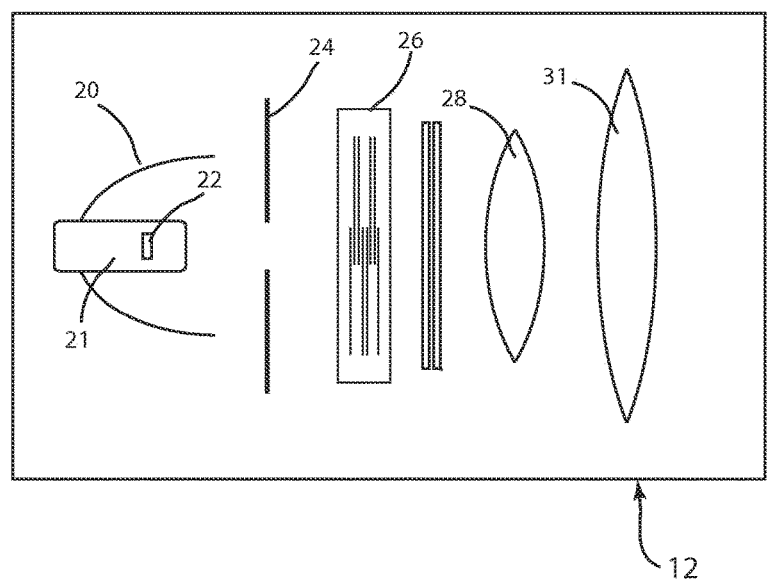
FIG. 2 illustrates a typical automated luminaire.
Figure 3:
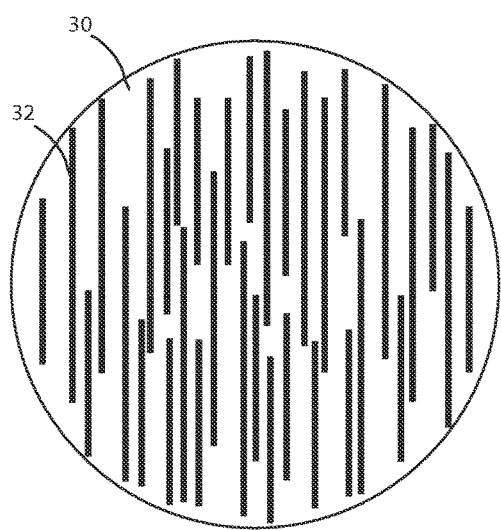
FIG. 3 illustrates a prior art beam shaper.
Figure 4:
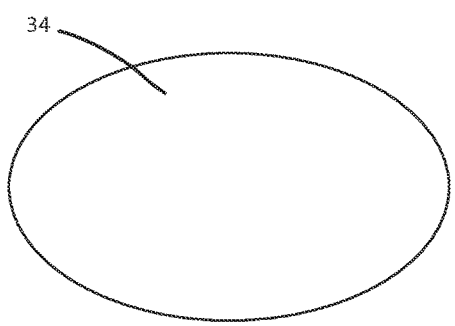
FIG. 4 illustrates a light beam after being modulated by the beam shaper of FIG. 3.
Figure 5:
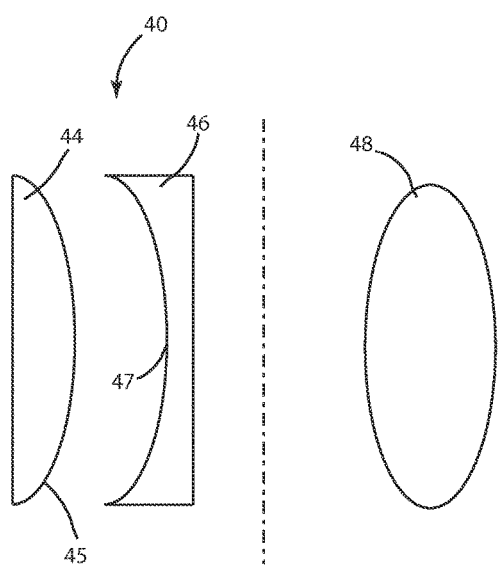
FIG. 5 illustrates a cross section of an innovative beam shaper lens pairing.

FIG. 5 illustrates a side view cross section of an innovative beam shaper lens pairing 40. In this embodiment, the pairing 40 is comprised of two optical elements 44 and 46. Element 44 may comprise a lenslet with at least one convex surface 45 and light beam view cross section 48. Element 46 may comprise a second lenslet with at least one concave surface 47 and a matching light beam view cross section 48. The convex surface 45 of element 44 and concave surface 47 of element 46 have equal and opposite geometries such that the convex surface 45 on element 44 may substantially nest into the concave surface 47 on element 46. Elements 44 and 46 may be circular or non-circular in cross section. Cross section 48 may be an ellipse as illustrated in FIG. 5. However, elements 44 and 46 may have any cross section 48 including, for example, circular, rectangular, ribbed, elliptical, lenticular, or nearly any other suitable shape.

Figure 6:
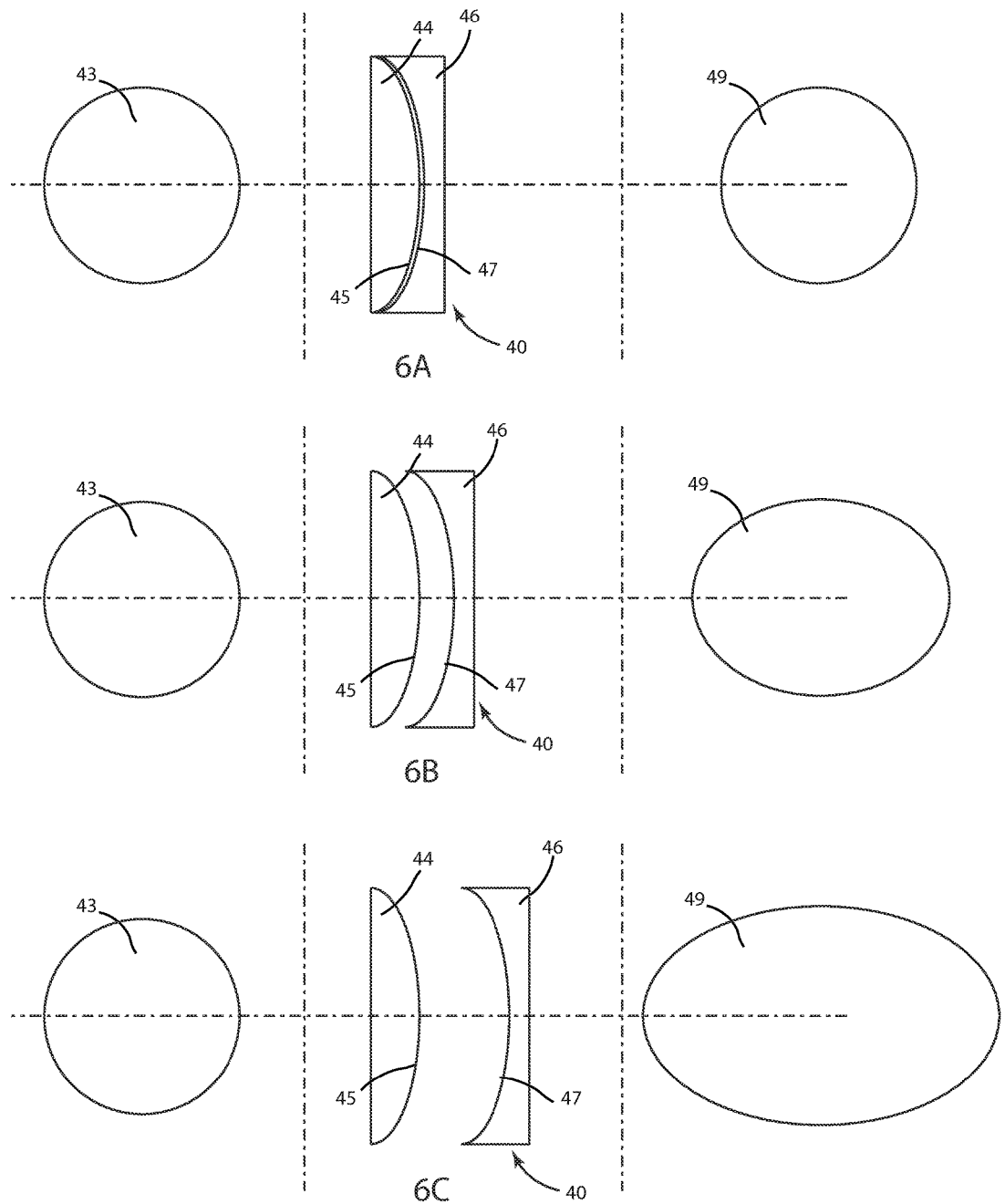
FIG. 6A, FIG. 6B, and FIG. 6C illustrate the beam shaping modulating effect of the beam shaper pairing illustrated in FIG. 5.

FIG. 6A, FIG. 6B and FIG. 6C together illustrate the operation of the beam shaper lens pairing 40 of FIG. 5, where the cross section 48 of optical elements 44 and 46 is non-circular. The first and second optical elements 44 and 46 may be moved parallel to the optical axis of the luminaire such that their relative separation along that axis may be adjusted. The movement of the elements 44 and 46 is facilitated by mechanical articulation means which are not shown. There are well known methods in the art for articulating such movement of optical elements 44 and 46 in a luminaire. The cross sectional shape of the input light beam 43 entering the beam shaper lens pairing 40 is illustrated to the left in each FIG. 6A, FIG. 6B, and FIG. 6C. The cross sectional shape of the light beam output 49 of the light beam exiting from the beam shaper lens pairing 40 is illustrated to the right in FIGS 6A-6C.

FIG. 6A illustrates the optical elements 44 and 46 of beam shaper lens pairing 40 substantially nested so that the convex surface 45 on element 44 is as close as reasonably possible to the concave surface 47 on element 46. In this configuration/position the optical effect of the two curved surfaces is cancelled out and the combination of optical elements 44 and 46 has almost no effect on the light beam output 49. In this position, the input light beam 43 cross section is unaffected by optical elements 44 and 46 and emerges from the system unchanged as light beam output 49.

FIG. 6B illustrates the optical elements 44 and 46 of beam shaper lens pairing 40 in a slightly separated position. In this position the optical effect of the two curved surfaces 45 and 47 is combined such that a circular input light beam 43 is constrained to a new non-circular light beam output 49. In the illustrated configuration, the output light beam is elliptical in cross section with a relatively small eccentricity and a relatively small increase in beam angle.

FIG. 6C illustrates the optical elements 44 and 46 of beam shaper lens pairing 40 where the two curved surfaces 45 and 47 are greatly separated. In this position, the optical effect of the two curved surfaces 45 and 47 is combined such that a circular input light beam 43 is constrained to a new non-circular light beam output 49. In the configuration illustrated, the output light beam is elliptical in cross section with a larger eccentricity and the output beam is significantly increased in beam angle.

Although only three positions of optical elements 44 and 46 of beam shaper lens pairing 40 are illustrated in FIG. 6A, FIG. 6B and FIG. 6C, in practice the separation of optical elements 44 and 46 along the optical axis may be adjustable continuously across a range and thus the size of the output beam may also be adjustable continuously across a range. This system allows the user to select any degree of beam shaping desired and is an improvement over prior art systems.

A special case of the embodiments illustrated in FIGS. 6A-6C occurs when the cross sections of optical elements 44 and 46 are circles. In that instance, the light beam output 49 will be unchanged in cross section from the input light beam 43 and the system will alter the beam angle (size) of the output only.

Figure 7:
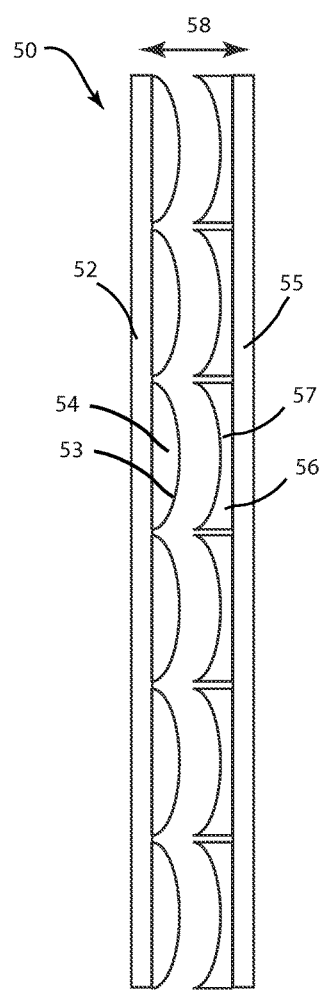
FIG. 7 illustrates a cross sectional view of a beam shaper comprised of multiple lenslets.
Figure 8:
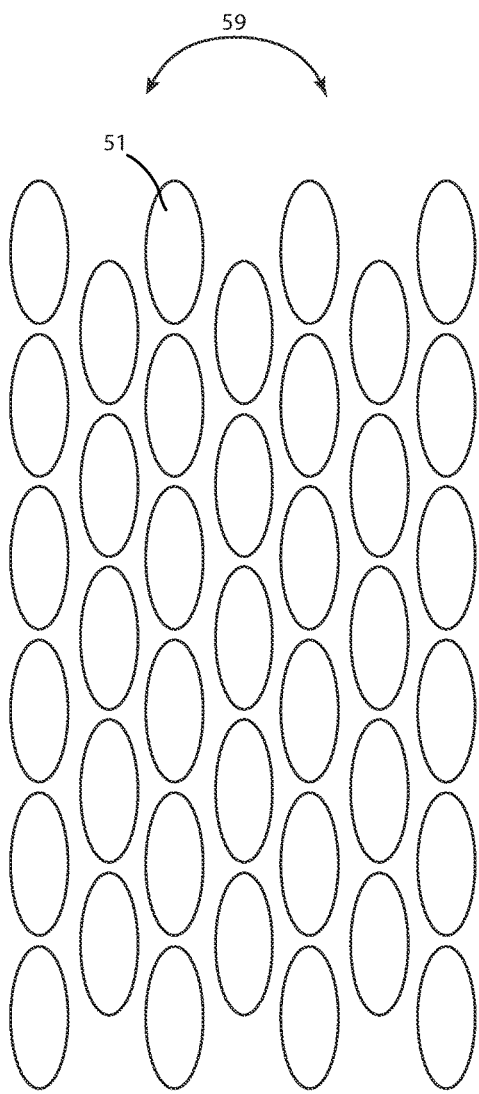
FIG. 8 illustrates a cross sectional view of an embodiment of an array structure with elliptical shaped lenslets.

FIG. 7 and FIG. 8 illustrate additional embodiments of an innovative beam shaper lens. FIG. 7 illustrates a cross sectional view of the beam shaper 50 comprised of optical element 52, which comprises an array of lenslets 54, each with at least one convex surface 53. Optical element 55 may comprise a second array of glass lenslets 56, each with at least one concave surface 57. The convex surfaces 53 of the array of lenslets 54 on optical element 52 and the concave surfaces 57 of the array of lenslets 56 on optical element 55 have equal and opposite geometries such that the convex surfaces 53 on optical element 52 will substantially nest into the concave surfaces 57 on optical element 55. Lenslets 54 and 56, forming matching arrays on optical elements 52 and 55, may each be circular or non-circular in cross section.

The cross section may be an ellipse, as illustrated in FIG. 8; however, in alternative embodiments the lenslets 54 and 56, forming arrays may have any cross section including, for example, circular, rectangular, ribbed, elliptical, lenticular, or any other shape. The only constraint on the design of such lenslets is that they should be capable of being designed as a matching convex/concave pair that can substantially nest one within the other. FIG. 8 illustrates the cross section view along the light beam axis of a portion of optical elements 52 and 55, showing an embodiment of an array structure with elliptical lenslets shape 51.

In order to obtain the desired continuous beam modulating effects, the optical elements 52 and/or 55 are articulated relative to each other in dimension 58 so that the relative distance between the optical elements 52 and 55 changes in dimension 58. Additionally, in order to modulate the angular orientation of the resultant modulating effect, the pair of optical elements 52 and 55 are articulated together in a rotational manner in the illustrated direction(s) 59 so that the angular orientation of the elliptical lenslets shape 51 are changed in the illustrated direction(s) 59 The mechanisms for achieving these articulation(s) are not shown in the figures but are well known in the art.

In an alternative embodiment (not shown) the rotational effect of the modulated eccentricity effect may be achieved by changing the orientation of the lenslets in a linear direction so that the light beam only passes through a portion of the lens array and the angular orientation of the effect changes as the array is shifted so that the light beam passes through lenslets with a different orientation.

Figure 9:
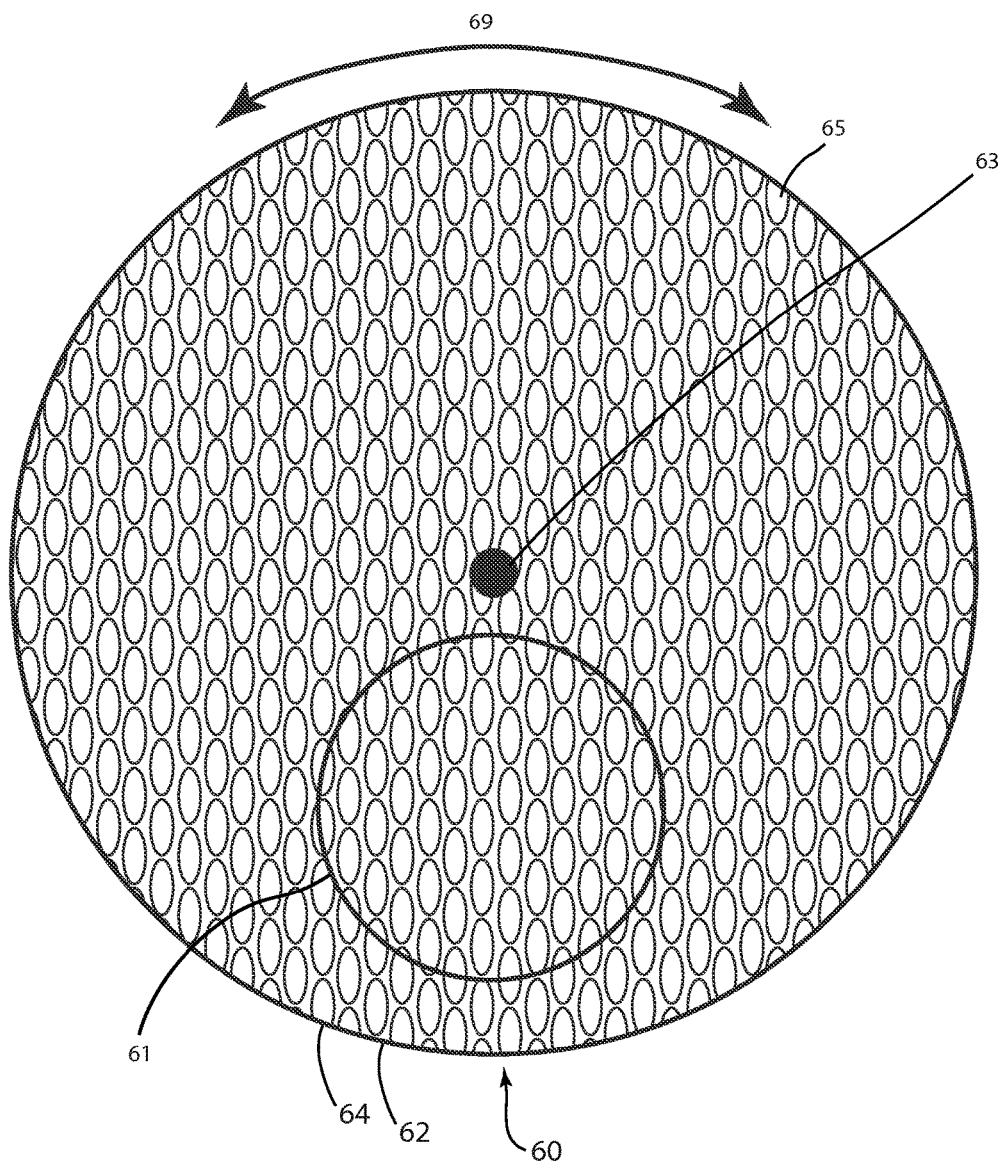
FIG. 9 illustrates an alternative embodiment of a beam shaper.
Figure 10:
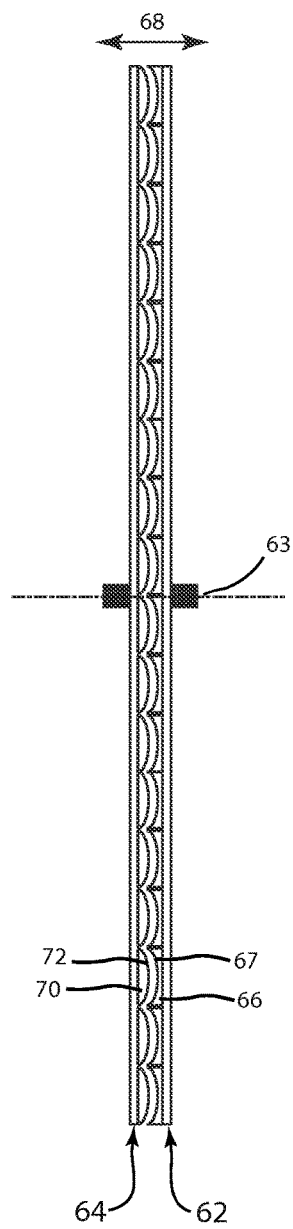
FIG. 10 illustrates a cross sectional view of a further embodiment of the beam shaper illustrated in FIG. 7 with the lenslet pairings closely nested.
Figure 11:
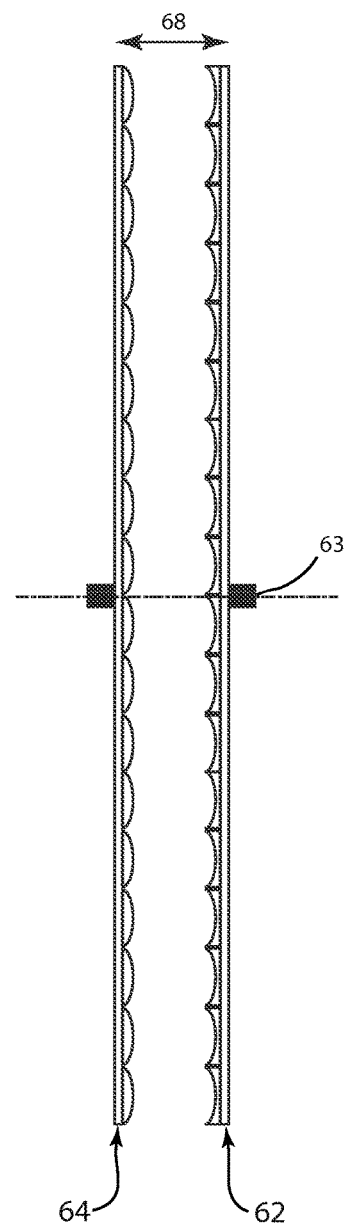
FIG. 11 illustrates a cross sectional view of a further embodiment of the beam shaper illustrated in FIG. 7 with the lenslet pairings separated.

FIG. 9, FIG. 10, and FIG. 11 illustrate a cross sectional view along the light beam axis of an alternative embodiment of a beam shaper 60 where arrays of nesting lenslets 65 are configured on circular discs 62 and 64 sharing a central axis 63 and combined in a single assembly. The assembly comprising circular discs 62 and 64 may be rotated, as shown by arrow 69, about that shared central axis 63 such that the orientation of the modulated effect in the output beam (not shown) may also be rotated. Although circular discs 62 and 64 are illustrated herein, the disclosure is not so limited and any shape of arrays of nesting lenslets 65 may be used without departing from the spirit of the disclosure.

Though not shown, the mechanisms for articulation of the discs are well known in the art. In some embodiments the optical beam may only pass through a portion of the disc 61. In such case it is only necessary to rotate the disc 90 degrees in order to obtain an appearance of full rotation of the eccentric beam shape modulation effect. For this embodiment it may be possible to drive the rotation of the disc from a central axis. In other embodiments the beam may pass through the entire array in which case it would be necessary to be able to rotate the discs 180 degrees to get the appearance of full rotation of the eccentric beam shape modulation effect. In this case it may be desirable to drive this rotation from the rim of the disc rather than the center of the disc.

FIG. 10 and FIG. 11 illustrate the cross section of a further embodiment of the disclosure where two optical elements 62 and/or 64 comprising arrays of nesting lenslets 66 and 70 may be moved parallel to/along the an axis 63 of the luminaire such that their separation varies along the axis 63 in dimensional direction 68. FIG. 10 shows the optical elements 62 and 64 with minimal separation in dimensional direction 68, such that the convex surfaces 72 on the lenslets 70 on element 64 are as close as reasonably possible to the concave surfaces 67 on the lenslets 66 on element 62. In this optical effect of the arrays of curved surfaces is cancelled out and the combination of optical elements 64 and 62 has almost no effect on the light beam.

FIG. 11 shows the optical elements 62 and 64 with increased separation in dimensional direction 68, such that the convex surfaces 72 on the lenslets 70 on element 64 are separated from the concave surfaces 67 on the lenslets 66 on element 62. In this position the optical effect of the two curved surfaces is combined such that a circular input light beam is constrained to a new cross section with increased beam shaping.

A single pair of optical elements with nesting lenslets has been illustrated here, however, the disclosure is not so limited and further embodiments may utilize a plurality of pairs of optical elements each with nesting lenslets. Each pair of optical elements may provide a differing amount and rotational angle of beam shaping. Such pairs of elements may be situated in series in the automated luminaire such that the light beam passes through all such pairs of optical elements and has a final beam shape defined by the combined effect of each pair.

Figure 12:
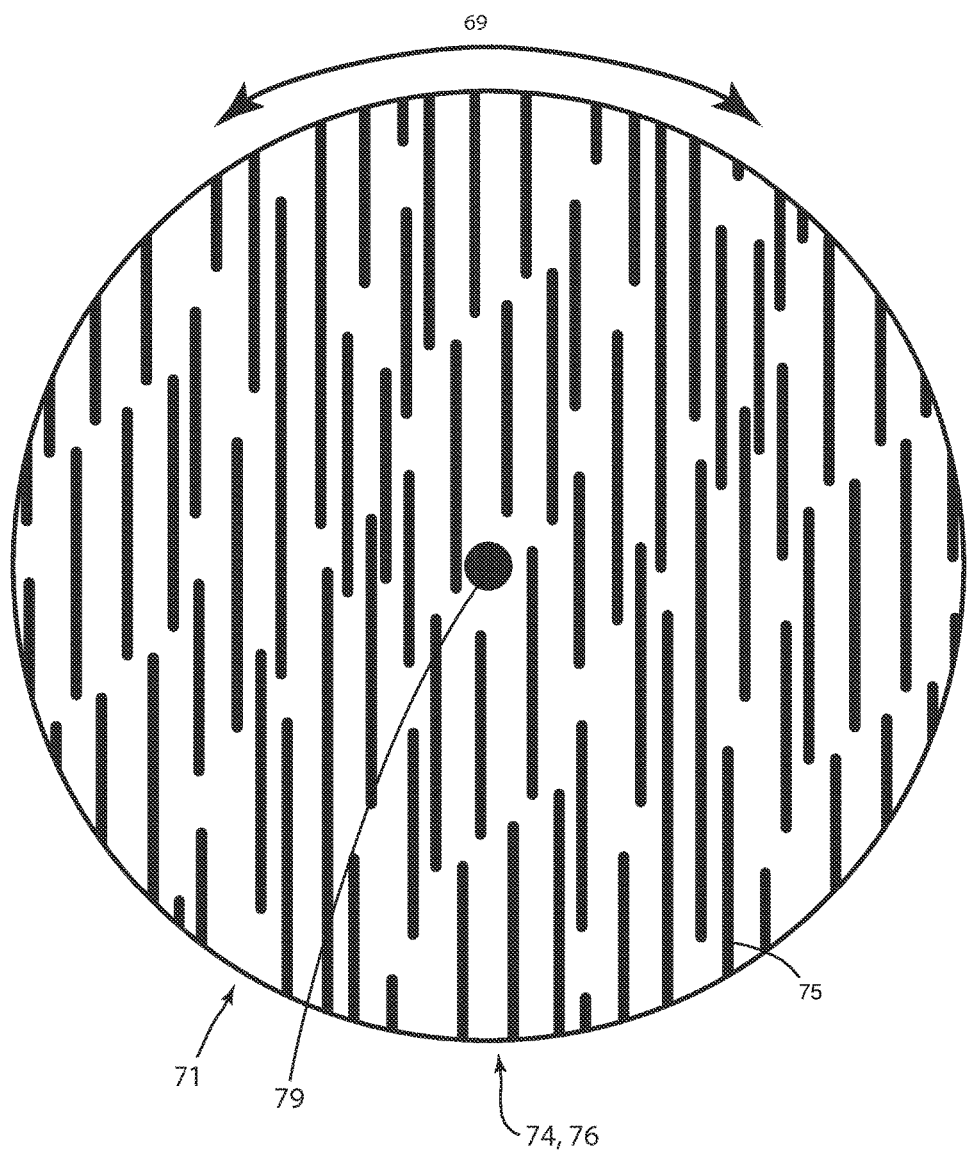
FIG. 12 illustrates a further embodiment of the beam shaper with differently shaped and configured lenslets.

FIG. 12 illustrates a view of a further embodiment of a beam shaper 71 where two optical elements 74 and 76 comprising arrays of nesting lenslets 75 configured as ribbed or lenticular lenses may be constructed as circular discs sharing a central axis 79 and combined in a single assembly. The assembly comprising optical elements 74 and 76 may be rotated, as shown by arrow 69, about the shared central axis 79 such that the output beam may also be rotated. Although circular discs are illustrated, the disclosure is not so limited and any shape of arrays of nesting lenslets may be used without departing from the spirit of the disclosure.

Figure 13:
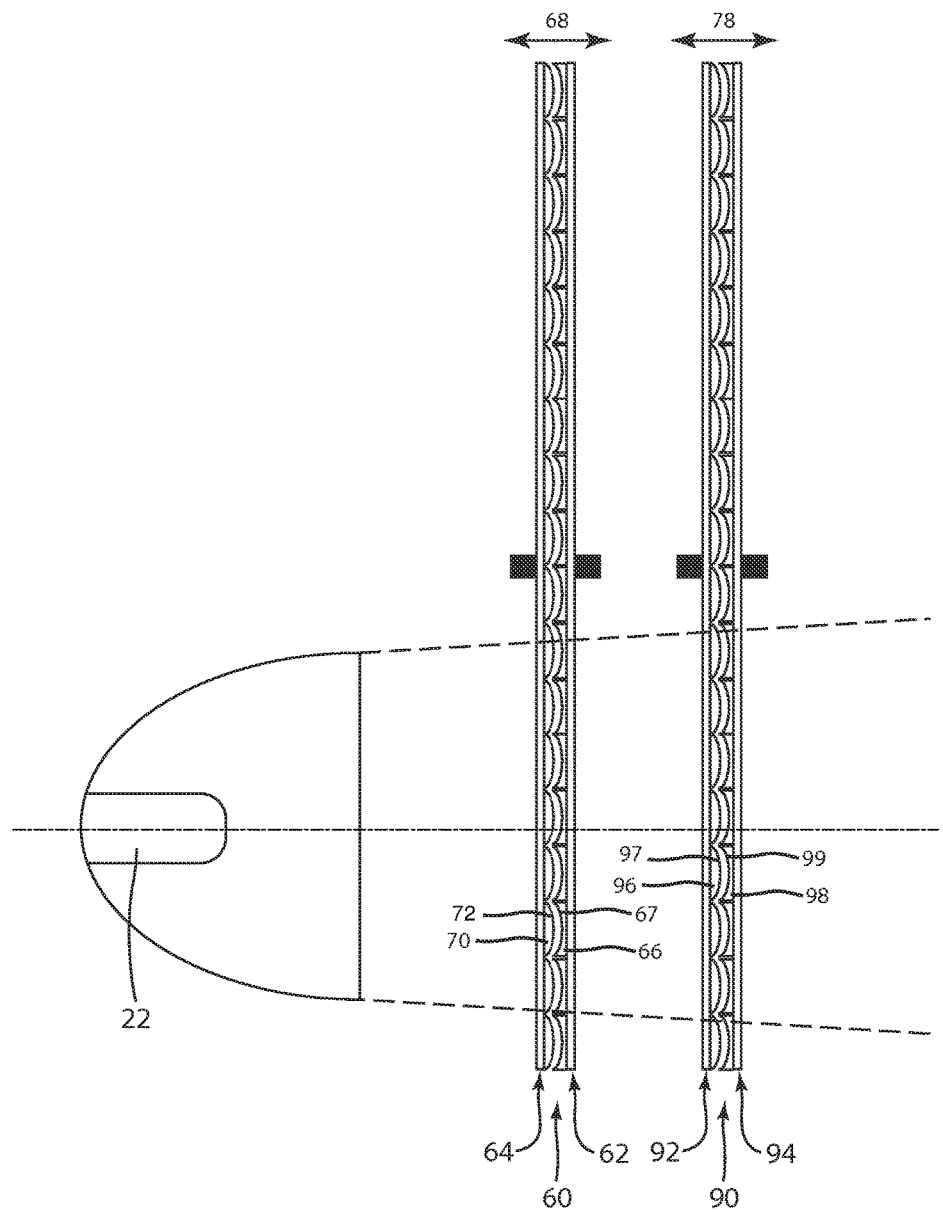
FIG. 13 illustrates an embodiment of a luminaire employing two beam shaper lens pairings.
Figure 14:
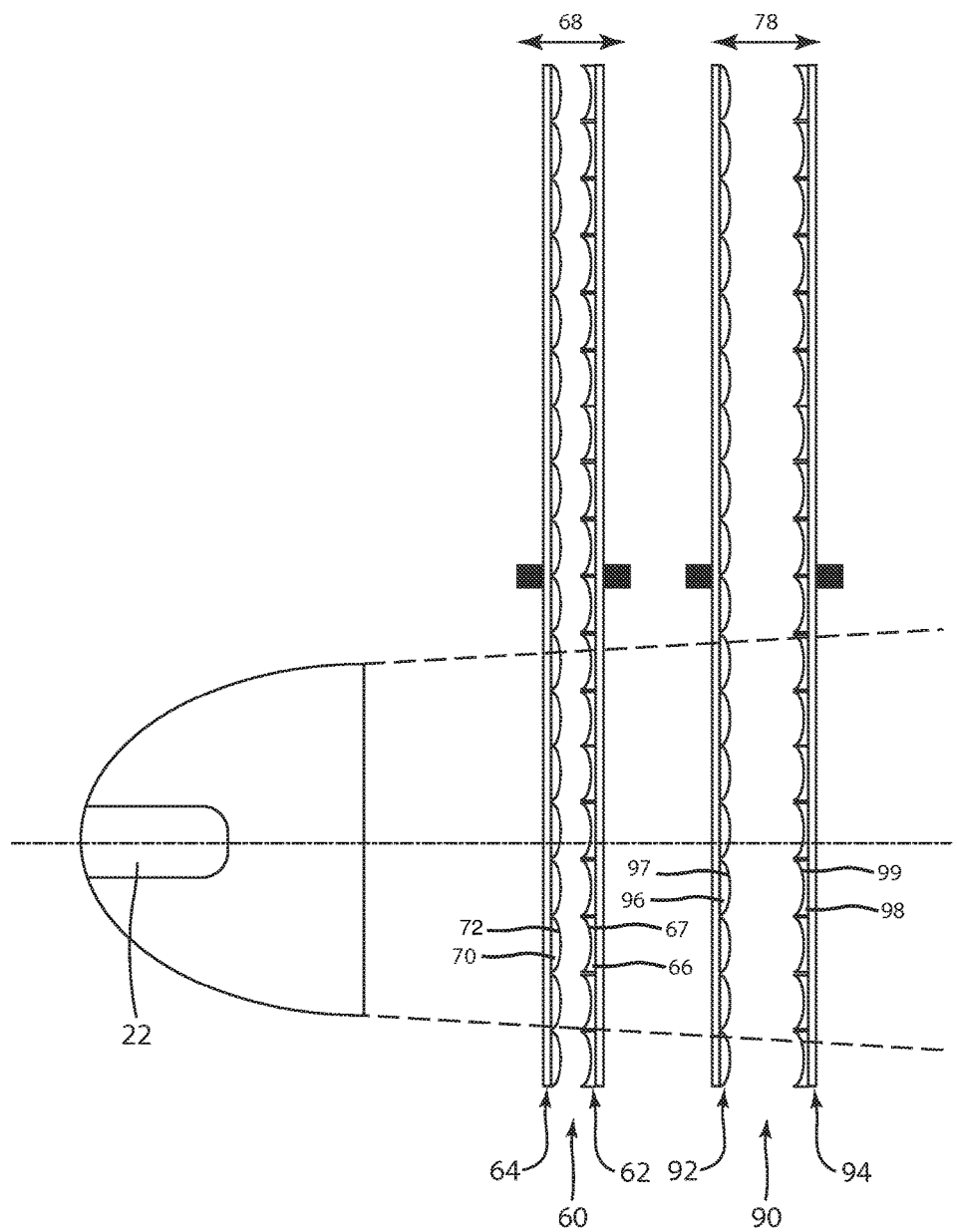
FIG. 14 illustrates a view of the embodiment of FIG. 13 showing the beam shaper pairings separated.

FIG. 13 and FIG. 14 illustrate a further embodiment of a luminaire employing two beam shaper lens pairings where light source 22 projects a beam through a series of beam shapers: first beam shaping pair 60 of two optical elements 62 and 64 comprising arrays of nesting lenslets 66 and 70 configured as ribbed or lenticular lenses and a second beam shaping pair 90 of two optical elements 92 and 94 comprising arrays of nesting lenslets 96 and 98 configured as ribbed or lenticular lenses. The first and second beam shaping pairs 60 and 90 of optical elements 62, 64 and 92, 94 may be constructed as circular discs each sharing a central axis and combined in a single assembly. The assembly comprising optical elements 60 and 62 may be rotated about a shared central axis such that the output beam (not shown) may also be rotated. Further, each pair of optical elements 62, 64 and 92, 94 comprising arrays of nesting lenslets 66 and 70 and 96 and 98 may be moved parallel to the central axis 63 of the luminaire such that their separation may be independently varied along that axis.

FIG. 13 shows the optical elements with minimal separation in dimensional directions 68 and 78 such that the convex surfaces 72 on the lenslets 70 on optical element 60 are as close as reasonably possible to the concave surfaces 67 on the lenslets 66 on optical element optical 62, and the convex surfaces 97 on the lenslets 96 on optical element 92 are as close as reasonably possible to the concave surfaces 99 on the lenslets 98 on optical element 94. In these positions the optical effects of the arrays of curved surfaces is cancelled out and the combination of elements 62, 64 and 92, 94 has almost no effect on the light beam.

FIG. 14 shows the optical elements with increased separation in dimensional directions 68 and 78 such that the convex surfaces 72 on the lenslets 70 on optical element 64 are separated from the concave surfaces 67 on the lenslets 66 on optical element 62, and the convex surfaces 97 on the lenslets 96 on optical element 92 are independently separated from the concave surfaces 99 on the lenslets 98 on optical element 94. In these positions the optical effect of the two arrays of curved surfaces is combined such that a circular input light beam is constrained to a new cross section with increased beam shaping from the combination of optical elements 62 and 64 and 92 and 94. In a further embodiment at least one pair of optical elements 62, 64 and 92, 94 may have a circular cross section as previously described such that the effect produced by that pair of optical elements is limited to beam size and there is no effect on the shape of the output beam. Further, the assemblies comprising optical elements 62, 64 and 92, 94 may be separately rotated about a central axis 63 such that the output beam may also be rotated.

In the case of lenslets with circular cross sections, rotation of the array will provide no meaningful effect. In some embodiments the last optical element 94 in the optical train is fixed. This is beneficial for a luminaire because this element can then serve as part of the luminaires housing, protecting the inner workings of the luminaire. However, it is not crucial as to which elements are actuated and which are fixed. It is important that the relative distance between elements within a pair can be varied and that their rotation can be coordinated so that the concave and convex lenslets can remain aligned during rotation of the array. Although circular discs are illustrated the disclosure is not so limited and any shape of arrays of nesting lenslets may be used without departing from the spirit of the disclosure.

Figure 15:
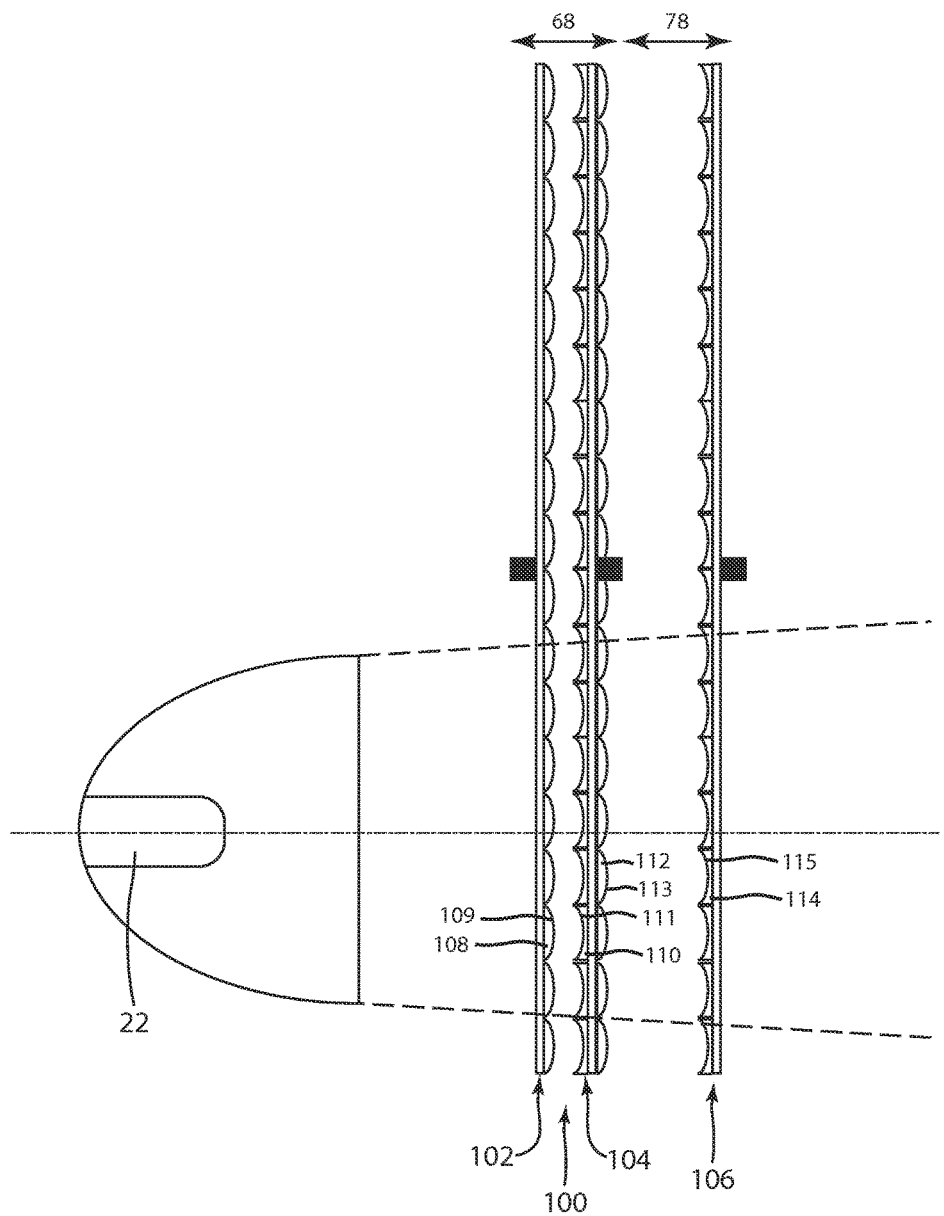
FIG. 15 illustrates an alternative embodiment of a beam shaper where the two beam shaper pairings share a common optical element.

FIG. 15 illustrates a cross sectional view of an alternative embodiment of a beam shaper 100. This beam shaper has three optical elements 102, 104 and 106 which each have arrays of lenslets. In this embodiment the first optical element 102 has an array of convex shaped lenslets 108 with convex surfaces 109 which face and nest with concave surfaces 111 on concave lenslets 110 on element 104. The other side of element 104 has an array of convex lenslets 112 with convex surfaces 113 which face and nest with concave surfaces 115 on concave lenslets 114 on element 106.

Figure 16:
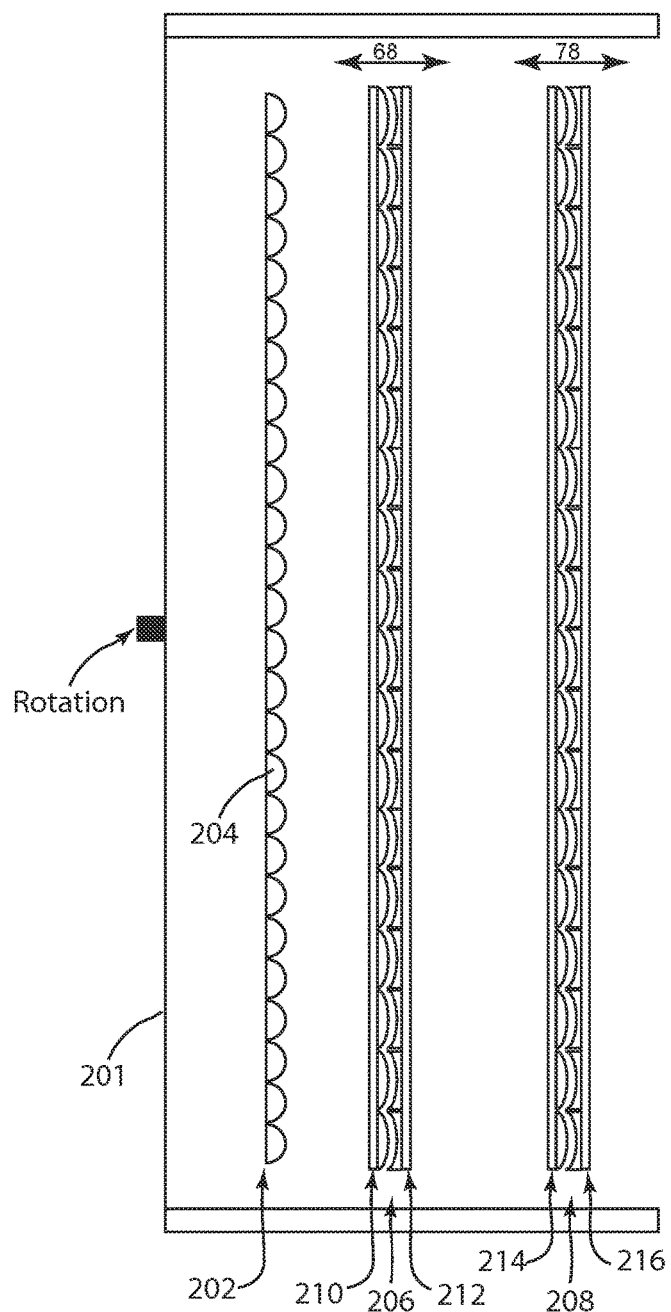
FIG. 16 illustrates an alternative embodiment of a beam shaper employing an LED array light source.

FIG. 16 illustrates a cross sectional view of yet another embodiment of a beam shaper 201. In this case the light source is an array 202 of light emitting diode (LED) sources 204. In the embodiment shown there are two beam shaping pairs 206 and 208. The pairings of optical elements 210 and 212 for beam shaping pair 206 and 214 and 216 for beam shaping pair 208 are similar to the previously described nesting lenslet pairings. They may be rotated about a central axis by an axle or may be driven to rotate from the outer edges. In some embodiments the beam shaping pair 206 and 208 may be rotated as a unit with the light source 202 in order to obtain change in the angular orientation of the eccentric modulated effect. The lenslets of these arrays may be circular, square, rectangular, or any other shape.

Figure 17:
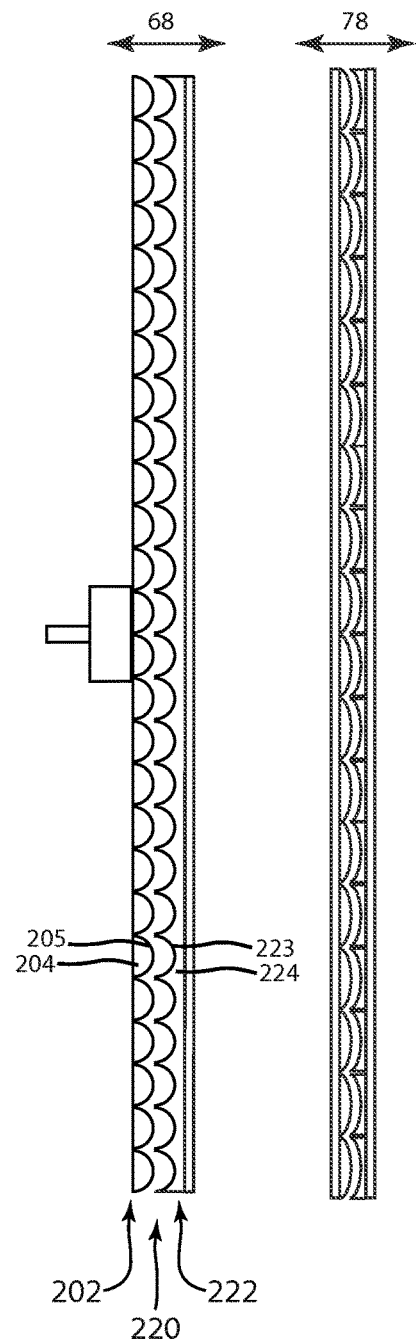
FIG. 17 illustrates an alternative embodiment of a beam shaper employing an LED array light source to serve as a lenslet array.

FIG. 17 illustrates an alternative embodiment of a beam shaper 220 employing an LED array light source 202. In this embodiment the convex surfaces 205 of the individual LED sources 204 is employed to serve as a lenslet array that nests with an optical element 222 with an array of concave lenslets 224 with concave surfaces 223.

Although the disclosure has been primarily described and illustrated with lenslets that are essentially elliptical in cross section the disclosure is not so limited and any cross section including, for example, circular, rectangular, ribbed, elliptical, lenticularm or any other shape may be used without departing from the spirit of the disclosure.

In a yet further embodiment a plurality of pairs of optical elements each with nesting lenslets is utilized where at least one of the plurality of optical elements with nesting lenslets may have lenslets with an elliptical cross section where the eccentricity of the ellipses is in unity such that the lenslets are circular in cross section and provides a beam angle control only with no change in beam shape.

It should be appreciated that in any cases where articulation of elements is called for herein but not shown, it is well within the known art to provide a variety of mechanisms that can achieve these necessary articulations.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

The invention claimed is:

1. An automated luminaire comprising:
a light beam generating light source;
a pair of lenticular lenslet arrays which are mounted to intersect and modulate the light beam;
wherein the lenticular lenslets of one array are shaped so a plurality of convex lenslets of one array nest into a plurality of concave lenslets of the other array;
wherein at least one lenslet array of the pair is articulated to change the separation distance between the lenslet arrays; and
wherein at least one lenslet array of the pair is articulated to rotate about a center of rotation and wherein the center of rotation of the lenslet array is outside the light beam.

2. The automated luminaire of claim 1 wherein the lenslet array farthest from the light source is fixed in position relative to the light beam.

3. The automated luminaire of claim 1 wherein the light source is an array of light sources.

4. The automated luminaire of claim 3 wherein the light source is an array of light emitting diodes (LEDs).

5. The automated luminaire of claim 1 wherein the light beam comprises a central axis, and the axis of rotation of the at least one lenslet array is parallel with the central axis of the light beam.

6. The automated luminaire of claim 1 wherein the light beam comprises an axis and both lenslet arrays are articulated to move along the axis of the light beam.

7. The automated luminaire of claim 1, wherein the pair of lenticular lenslet arrays comprises a first pair of lenticular lenslet arrays, the automated luminaire further comprising a second pair of lenticular lenslet arrays, mounted to intersect and modulate the light beam;
wherein the lenticular lenslets of one array of the second pair are shaped so a plurality of convex lenslets of the one array nest into a plurality of concave lenslets of the other array of the second pair;
wherein at least one lenslet array of the second pair is articulated to change the separation distance between the lenslet arrays of the second pair; and
wherein at least one lenslet array of the second pair is articulated to rotate about a center of rotation and wherein the center of rotation of the one lenslet array of the second pair is outside the light beam.

8. The automated luminaire of claim 7 wherein the light source is an array of light sources.

9. The automated luminaire of claim 8 wherein the light source is an array of LEDs.

10. The automated luminaire of claim 7 wherein the light beam comprises a central axis, and the axis of rotation of the first pair of lenslet arrays is parallel with the central axis of the light beam.

11. The automated luminaire of claim 7 wherein the light beam comprises an axis and both the first and second pairs of lenslet arrays are articulated to move along the light beam axis.

12. The automated luminaire of claim 7 wherein both the first and second pairs of lenslet arrays comprise a lenslet array which is articulated to rotate in the light beam.

13. The automated luminaire of claim 7 wherein the light beam comprises a central axis, and the axis of rotation of the at least one lenslet array of each of the first and second pairs of lenslet arrays is parallel with the central axis of the light beam.

14. The automated luminaire of claim 7 wherein the light beam comprises an axis and both lenslets arrays in both pairs of lenslet arrays are articulated to move along the axis of the light beam.

15. The automated luminaire of claim 7 wherein the light beam comprises an axis and all but the lenslet array furthest from the light source are articulated to move along the axis of the light beam.

16. The automated luminaire of claim 7 wherein the light beam comprises an axis and the lenslet array furthest from the light source is fixed in position relative to the light beam.

* * * * *

UNITED STATES PATENT AND TRADEMARK OFFICE
CERTIFICATE OF CORRECTION

PATENT NO. : 10,359,636 B2
APPLICATION NO. : 14/060458
DATED : July 23, 2019
INVENTOR(S) : Pavel Jurik Page 1 of 1

It is certified that error appears in the above-identified patent and that said Letters Patent is hereby corrected as shown below:

In the Specification

Column 3, Line 62 replace "6B and" with --6B, and--

Column 7, Line 58 replace "concave surfaces 223." with --surfaces 223.--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*